(12) United States Patent
Arboleda et al.

(10) Patent No.: US 7,468,973 B2
(45) Date of Patent: Dec. 23, 2008

(54) SWITCH DATA TRANSFORM TO IMS PROCESS

(75) Inventors: Carolina R. Arboleda, Aurora, IL (US); Christina A. Chiapetta, Naperville, IL (US); Dean Craig, Naperville, IL (US); Gregory A. Freitag, Batavia, IL (US); George P. Wilkin, Bolingbrook, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 54 days.

(21) Appl. No.: 11/482,624

(22) Filed: Jul. 7, 2006

(65) Prior Publication Data

US 2008/0112389 A1 May 15, 2008

(51) Int. Cl.
*H04L 12/66* (2006.01)
(52) U.S. Cl. ............... 370/352; 370/353; 370/354
(58) Field of Classification Search ............ 370/352, 370/442, 522; 455/405; 379/229
See application file for complete search history.

(56) References Cited

U.S. PATENT DOCUMENTS

| 6,741,695 | B1 * | 5/2004 | McConnell et al. ......... 379/229 |
|---|---|---|---|
| 2004/0008718 | A1 * | 1/2004 | English et al. ............. 370/442 |
| 2004/0042509 | A1 * | 3/2004 | Gallant et al. ............. 370/522 |
| 2006/0021941 | A1 * | 10/2006 | Kishinsky et al. .......... 370/352 |
| 2006/0221941 | A1 * | 10/2006 | Kishinsky et al. .......... 370/352 |
| 2007/0173226 | A1 * | 7/2007 | Cai et al. .................. 455/405 |

* cited by examiner

*Primary Examiner*—Fan Tsang
*Assistant Examiner*—Simon King

(57) ABSTRACT

An apparatus in one example has: a public switched telephone network; an Internet Protocol network; migration portal operatively coupled to the Internet Protocol network and to the public switched telephone network; and the migration portal having an information converter, the information converter having inputs for receiving public switched telephone number related information that is utilized in the public switched telephone network, and having outputs for providing Voice Over Internet Protocol telephone number related information that is utilized in the Internet Protocol network, the Voice Over Internet Protocol telephone number related information being a function of a predetermined subset of the public switched telephone number related information.

21 Claims, 4 Drawing Sheets

US 7,468,973 B2

SWITCH DATA TRANSFORM TO IMS PROCESS

TECHNICAL FIELD

The invention relates generally to telecommunication systems and, more specifically, to conversion of data stored in legacy telephone switches into data for next generation network switches.

BACKGROUND

A public switched telephone network (PSTN) is generally known and may be a domestic telecommunications network usually accessed by telephones, key telephone systems, private branch exchange trunks, and data arrangements. Completion of the circuit between the call originator and call receiver in a PSTN requires network signaling in the form of dial pulses or multi-frequency tones.

VoIP technology is used for transmitting ordinary telephone calls over the Internet using packet linked routes. VoIP is also referred to as IP telephony. VoIP involves the transmission of telephone calls over a data network like the Internet. In other words, VoIP can send voice, fax and other information over the Internet, rather than through the (PSTN) or regular telephone network.

The volume of work for service Professionals requires that they not just work faster but work smarter in the management and operation of VoIP networks. To achieve this goal there is a need for appropriate platforms and tool assets. In the telephony manufacturing and services market there is a need to quickly move thousands of customers and system configuration information from legacy systems to state of the art VoIP systems from various vendors. Present methods are complex in nature and costly both in terms of time and money.

Thus, there is a need in the art for an apparatus and method that provides improved conversion of data stored in legacy telephone switches into data for next generation network switches.

SUMMARY

One embodiment of the present method and apparatus encompasses an apparatus. This embodiment may comprise: a first network; a second network; migration portal operatively coupled to the second network and to the first network; and the migration portal having an information converter, the information converter having inputs for receiving first number related information that is utilized in the first network, and having outputs for providing second telephone number related information that is utilized in the second network, the second telephone number related information being a function of a predetermined subset of the first number related information.

Another embodiment of the present method and apparatus encompasses a method. This embodiment may comprise: operatively coupling a migration portal to a legacy network and to a next generation network; receiving legacy telephone number related information that is utilized in the legacy network; selecting a subset of the legacy telephone number related information that is relevant to the next generation network; converting the subset of legacy telephone number related information to next generation telephone number related information format that is utilized in the next generation network; and sending the next generation telephone number related information to the next generation network.

DESCRIPTION OF THE DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

DETAILED DESCRIPTION

Embodiments of the present method and apparatus are directed to switch data transform to an IMS (IP Multimedia Subsystem) transform. IMS is a general-purpose, open industry standard for voice and multimedia communications over packet-based IP networks. It is a core network technology, which can serve as a low-level foundation for technologies like Voice over IP (VoIP), Push-To-Talk (PTT), Push-To-View, Video Calling, and Video Sharing. IMS is based primarily on SIP (session initiation protocol).

Figure 1:
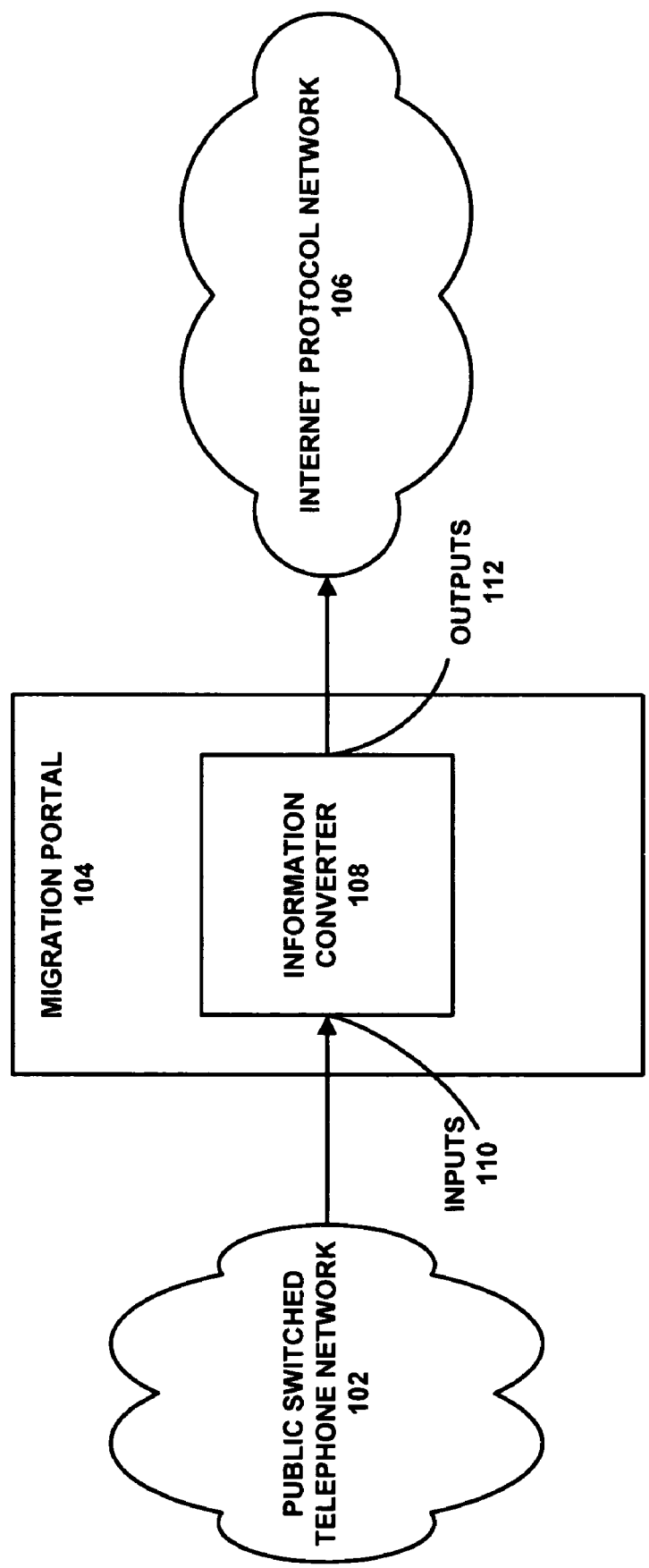
FIG. 1 depicts in general an embodiment of the present method and apparatus.

FIG. 1 depicts one embodiment of an embodiment of the present method and apparatus. In this embodiment a first network, such as a public switched telephone network 102 may be operatively coupled to a second network, such as an Internet Protocol Network 106 via a migration portal 104. The migration portal 104 may have an information converter 108. The information converter 108 may have inputs 110 for receiving first number related information that is utilized in the first network 102, and having outputs 112 for providing second telephone number related information that is utilized in the second network 106. The second telephone number related information may be a function of a predetermined subset of the first number related information.

This migration portal 104 allows, for example a company that operates the Internet Protocol Network, to transform customer data from the legacy system 102 to the next generation VOIP system 108. Specialized code may convert, for example, class 3, 4 or 5 telephony switch data, text files, and data from other manufacturers into data files appropriates for VoIP based systems. The conversion may be performed, for example, using custom C++, Java, XML, and XSLT code to perform the transformation. In some embodiments target users for this service may be a telephone operating company, enterprise information technology (IT) administration management, and the technical experts on VoIP conversions.

Older telephony networks, such as public switched telephone networks may contain switches, such as the class 3, 4 or 5 telephony switches, and may be referred to as legacy networks. In general terms transformation code reads the data related to the class 3, 4 or 5 telephony switches and selects only predetermined needed portions of information.

This selected information is then stored in a common data base to allow for further data manipulation. A network element formation platform then runs transformations on the selected data and outputs text files and executable files. The text files contain the usable data, which may be in an encrypted format, and the executable files perform the movement of the data into the next generation system, such as a VoIP system. The platform not only may be a product but may also be a collection of operational and business processes involved in data migration.

Figure 2:
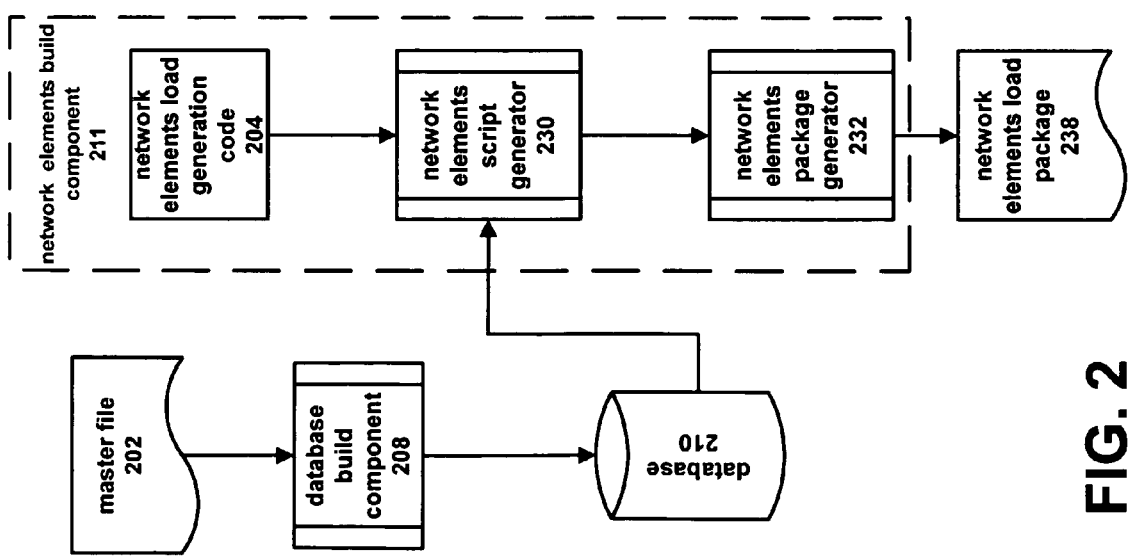
FIG. 2 is a more detailed depiction of an embodiment of the present method and apparatus.

FIG. 2 is a more detailed depiction of an embodiment of the present method and apparatus. As depicted a master file 202 has data fields and specifications for the data fields, and process specifications for how to handle the data fields. The master file contains the public switched telephone number related information. The public switched telephone number related information may have at least specific personal information, interconnect backbone information, telephone trunk and routing assignments, and parameters and configuration values for call processing features and services. Such information may be included in the public switched telephone number related information for each network element in the network. The master file 202 may be operatively coupled to a database build component 208 that in general forms the information for the next generation network. This information is stored in a database 210.

A network element build component 211 then takes the information from the database 210 and place into the proper format for use in the next generation network. That is, the process is applied to each network element in order until a complete set of element data is prepared. The resulting information, such as Voice Over Internet Protocol telephone number related information, is loaded into a network element load package 238.

The network element build component 211 may have a network element load generation code 204 that has a set of tools and processes that allow data to be loaded into the next generation network. It may also contain the rules for gathering information from the legacy system. That is, the network element load generation code 204 may be considered to be an upload and download interface.

The network element load generation code 204 may be operatively coupled to a network element script generator 230, which may also be operatively coupled to the database 210. The network element script generator 230 takes data from the database 210 and generates specific scripts, that is specific commands for a respective network element that is then transferred to a network element package generator 232, which outputs a network element load package 238 for use in the next generation network.

Figure 3:
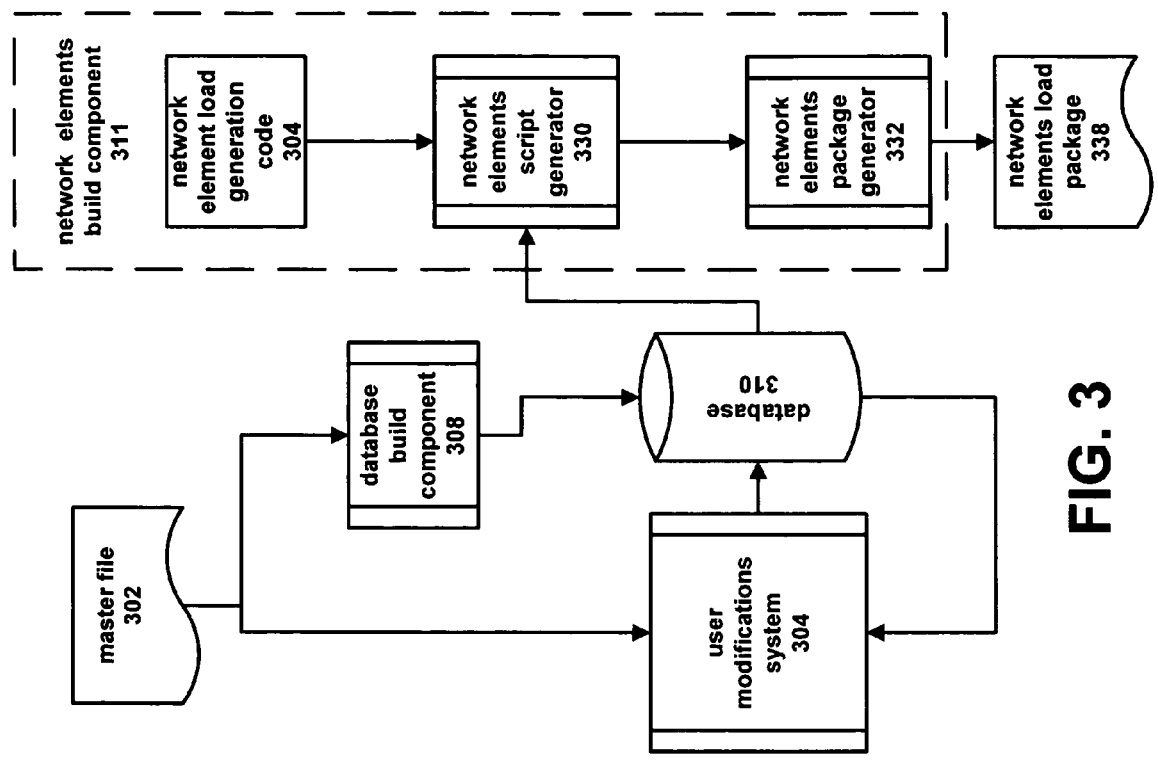
FIG. 3 is a further more detailed depiction of an embodiment of the present method and apparatus.

FIG. 3 is a further more detailed depiction of an embodiment of the present method and apparatus. The elements 302, 308, 310, 311, 304, 330, 332, and 338 correspond to the structure and operation of those described above regarding the embodiment depicted in FIG. 2. The FIG. 3 embodiment further includes a user modifications system 304 that allows a user to modify the data stored in the database 310. The user modifications system 304 may be operatively coupled to the database 310 and the master file 302.

Figure 4:
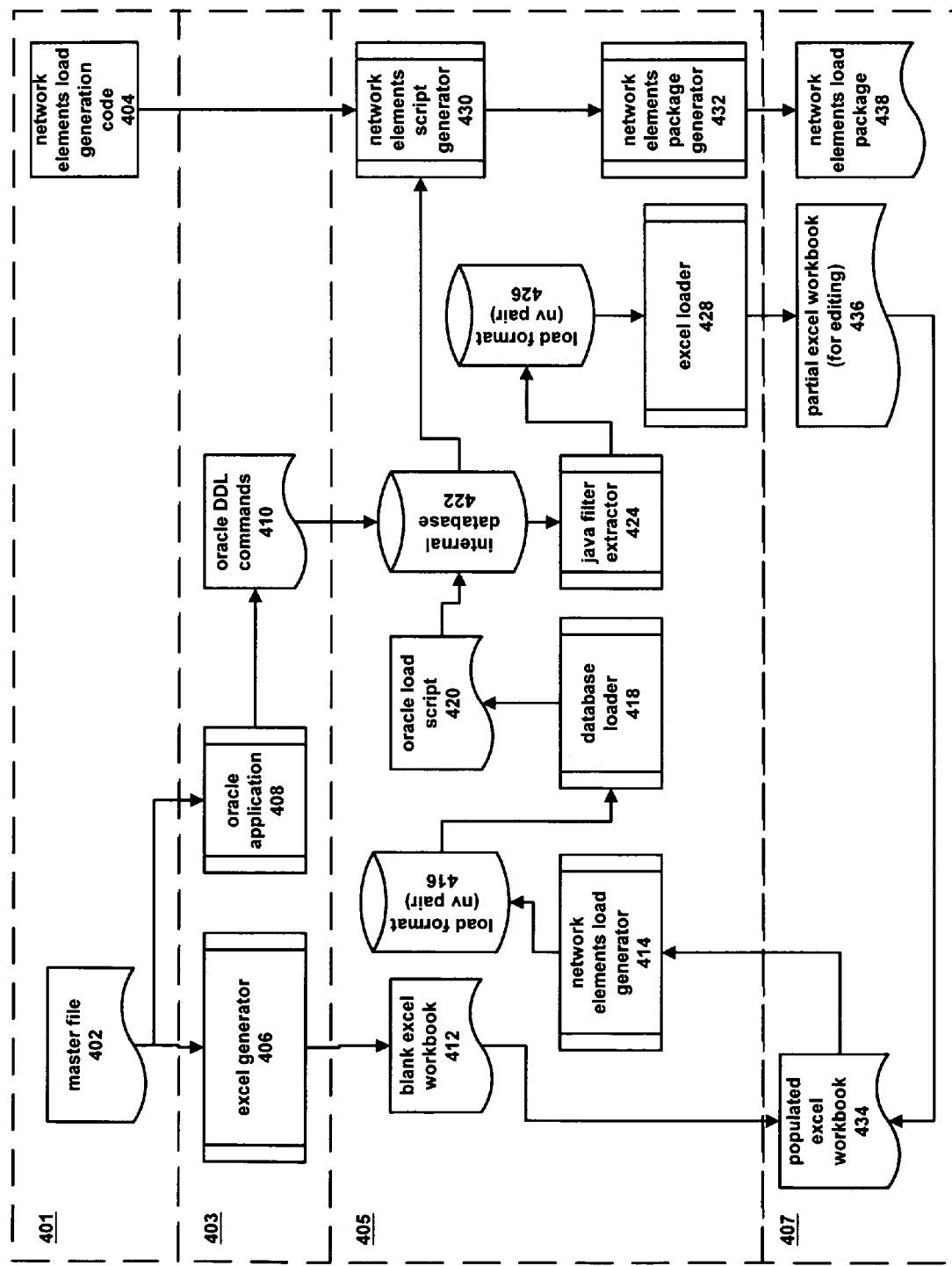
FIG. 4 is a detailed block diagram of an embodiment according to the present method and apparatus.

FIG. 4 is a detailed block diagram of an embodiment according to the present method and apparatus. The master file 402 may be operatively coupled to an MS EXCEL generator 406 and to an ORACLE application 408. The ORACLE application 408 may be operatively coupled to ORACLE DDL commands 410. The ORACLE DDL commands 410 may be operatively coupled to the internal database 422.

A system for making user modifications may have MS EXCEL generator 406 which outputs an MS EXCEL workbook 412 which the user may use for the modifications which results in the populated MS EXCEL workbook 434. A network element load generator 414 is operatively coupled to a load format database 416, which is operatively coupled to a database loader 418, which is turn is operatively coupled to an ORACLE load script 420. These components update the data in the database 422 with the data in the populated MS EXCEL workbook 434. Furthermore, data may be relayed back to the populated MS EXCEL workbook 434 via a java filter extractor 424, a load format database 426, an MS EXCEL loader 428, and a partial MS EXCEL workbook 436. It is to be understood that this is only one example of a user interface for implementing modifications. For example, it may be Web based rather than MS EXCEL based.

The network load generation code 404 may be operatively coupled to a network elements script generator 430, which may also be operatively coupled to the database 410. The network element script generator 430 takes data from the database 410 and generates specific scripts, that is specific commands for a respective network element that is then transferred to a network element package generator 432, which outputs a network element load package 438 for use in the next generation network. The load package is comprised of text files and executable files for each of the network elements in the next generation network.

Figure 5:
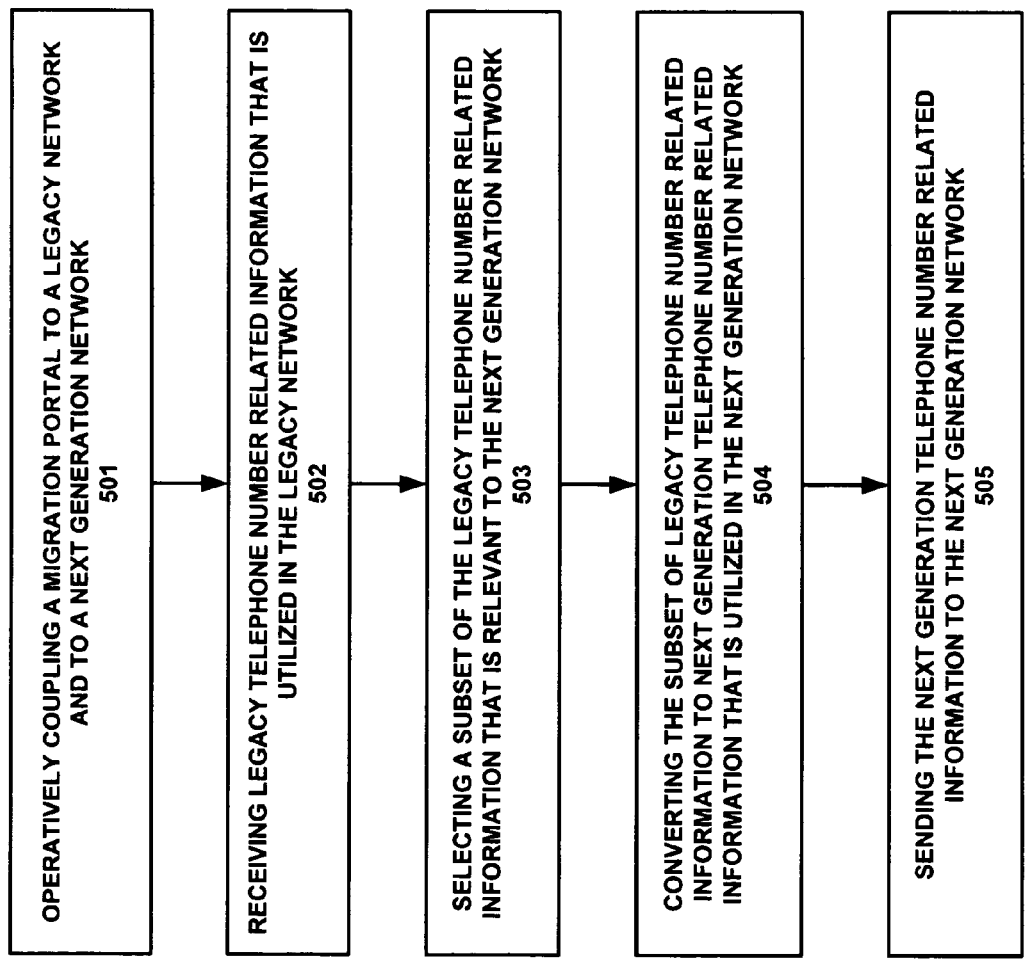
FIG. 5 is a flow diagram of an embodiment according to the present method.

FIG. 5 is a flow diagram of an embodiment according to the present method. This embodiment may have the steps of: operatively coupling a migration portal to a legacy network and to a next generation network; receiving legacy telephone number related information that is utilized in the legacy network; selecting a subset of the legacy telephone number related information that is relevant to the next generation network; converting the subset of legacy telephone number related information to next generation telephone number related information that is utilized in the next generation network; and sending the next generation telephone number related information to the next generation network.

In further embodiments the method may further comprise: storing the converted subset of legacy telephone number related information in a common database and transforming the stored subset of legacy telephone number related information into text files and executable files that are sent to the next generation network. The text files may contain usable data, and the executable files may perform a movement of the usable data into the next generation network.

The legacy telephone number related information may have at least specific personal information, interconnect backbone information, telephone trunk and routing assignments, and parameters and configuration values for call processing features and services, and wherein the next generation telephone number related information has at least specific personal information, interconnect backbone information, telephone trunk and routing assignments, and parameters and configuration values for call processing features and services. The interconnect backbone information, of each of the legacy telephone number related information and the next generation telephone number related information, may have major information and minor information, wherein the major information has at least trunk assignments and cross switch transport linkage, and wherein the minor information has at least assignments and terminations for individual subscribers and/or data lines.

The present apparatus in one example may comprise a plurality of components such as one or more of electronic components, hardware components, and computer software components. A number of such components may be combined or divided in the apparatus.

The present apparatus may employ at least one computer-readable signal-bearing media that may store software, firmware and/or assembly language, etc. The computer-readable signal-bearing medium may comprise magnetic, electrical, optical, biological, and/or atomic data storage mediums. For example, the computer-readable signal-bearing medium may comprise floppy disks, magnetic tapes, CD-ROMs, DVD-ROMs, hard disk drives, and electronic memories, etc. The computer-readable signal-bearing medium may also comprise a modulated carrier signal transmitted over a network comprising or coupled with the apparatus, for instance, at least one of a telephone network, a local area network ("LAN"), a wide area network ("WAN"), the Internet, and a wireless network.

The present method and apparatus are not limited to the particular details of the depicted embodiments and other modifications and applications are contemplated. Certain other changes may be made in the above-described embodiments without departing from the true spirit and scope of the present method and apparatus herein involved. It is intended, therefore, that the subject matter in the above depiction shall be interpreted as illustrative and not in a limiting sense.

We claim:

1. An apparatus, comprising:
a first network;
an second network;
migration portal operatively coupled to the second network and to the first network; and
the migration portal having an information converter, the information converter having inputs for receiving first number related information that is utilized in the first network, and having outputs for providing second telephone number related information that is utilized in the second network, the second telephone number related information being a function of a predetermined subset of the first number related information;
wherein a processor with transformation code reads data related to the class 3, 4 or 5 telephony switches and selects only predetermined portions of information as usable data, wherein the selected information is stored in a common database to allow for further data manipulation, wherein the information converter runs transformations on the selected data and outputs text files and executable files, the text files containing the useable data and the executable files perform the movement of the useable data into a VoIP system in order to transfer customers and system configuration information from legacy systems to state of the art VoIP systems;
wherein the information converter has a master file with data fields and specifications for the data fields, and having process specifications for how to handle the data fields, wherein the master file is operatively coupled to a database build component that forms the information that is stored in a database, and wherein the information converter has a network element build component, wherein the network element build component has a network element load generation code that is an upload and download interface, wherein the network element load generation code is operatively coupled to a network element script generator, which is operatively coupled to the database, and wherein the network element script generator is operatively coupled to a network element package generator.

2. The apparatus according to claim 1, wherein the information converter selects only predetermined needed portions of information from the first related data to produce modified telephone number related data that is the predetermined subset of the first number related information.

3. The apparatus according to claim 2, wherein the information converter stores the modified telephone number related data in a common database.

4. The apparatus according to claim 3, wherein the information converter further comprises an network element formation platform then runs transformations on the stored modified telephone number related data and that outputs text files and executable files.

5. The apparatus according to claim 1, wherein the first number related information has at least specific personal information, interconnect backbone information, telephone trunk and routing assignments, and parameters and configuration values for call processing features and services, and wherein the second telephone number related information has at least specific personal information, interconnect backbone information, telephone trunk and routing assignments, and parameters and configuration values for call processing features and services.

6. The apparatus according to claim 5, wherein the interconnect backbone information, of each of the first number related information and the second telephone number related information, has major information and minor information, wherein the major information has at least trunk assignments and cross switch transport linkage, and wherein the minor information has at least assignments and terminations for individual subscribers and/or data lines.

7. The apparatus according to claim 1, wherein the first network is a legacy network, and wherein the second network is a next generation network.

8. An apparatus, comprising:
a public switched telephone network;
an Internet Protocol network;
migration portal operatively coupled to the Internet Protocol network and to the public switched telephone network; and
the migration portal having an information converter; the information converter having inputs for receiving public switched telephone number related information that is utilized in the public switched telephone network, and having outputs for providing Voice Over Internet Protocol telephone number related information that is utilized in the Internet Protocol network, the Voice Over Internet Protocol telephone number related information being a function of a predetermined subset of the public switched telephone number related information;
wherein a processor with transformation code reads data related to the class 3, 4 or 5 telephony switches and selects only predetermined portions of information as usable data, wherein the selected information is stored in a common database to allow for further data manipulation, wherein the information converter runs transformations on the selected data and outputs text files and executable files, the text files containing the useable data and the executable files perform the movement of the useable data into a VoIP system in order to transfer customers and system configuration information from legacy systems to state of the art VoIP systems;
wherein the information converter has a master file with data fields and specifications for the data fields, and having process specifications for how to handle the data fields, wherein the master file is operatively coupled to a database build component that forms the information that is stored in a database, and wherein the information converter has a network element build component, wherein the network element build component has a network element load generation code that is an upload and download interface, wherein the network element load generation code is operatively coupled to a network element script generator, which is operatively coupled to the database, and wherein the network element script generator is operatively coupled to a network element package generator.

9. The apparatus according to claim 8, wherein the public switched telephone number related information has at least one class 3, 4 or 5 telephony switch that contains public switched telephone related data, wherein the information converter reads the public switched telephone related data contained in the class 3, 4 or 5 telephony switch.

10. The apparatus according to claim 8, wherein the information converter selects only predetermined needed portions of information from the public switched telephone related data to produce modified telephone number related data that is the predetermined subset of the public switched telephone number related information.

11. The apparatus according to claim 10, wherein the information converter stores the modified telephone number related data in a common database.

12. The apparatus according to claim 11, wherein the information converter further comprises an network formation platform then runs transformations on the stored modified telephone number related data and that outputs text files and executable files.

13. The apparatus according to claim 12, wherein the text files contain usable data for the Internet Protocol network and wherein the executable files perform a movement of the usable data into the Internet Protocol network.

14. The apparatus according to claim 8, wherein the public switched telephone number related information has at least specific personal information, interconnect backbone information, telephone trunk and routing assignments, and parameters and configuration values for call processing features and services, and wherein the Voice Over Internet Protocol telephone number related information has at least specific personal information, interconnect backbone information, telephone trunk and routing assignments, and parameters and configuration values for call processing features and services.

15. The apparatus according to claim 14, wherein the interconnect backbone information, of each of the public switched telephone number related information and the Voice Over Internet Protocol telephone number related information, has major information and minor information, wherein the major information has at least trunk assignments and cross switch transport linkage, and wherein the minor information has at least assignments and terminations for individual subscribers and/or data lines.

16. A method, comprising:
operatively coupling a migration portal to a legacy network and to a next generation network;
receiving legacy telephone number related information that is utilized in the legacy network;
selecting a subset of the legacy telephone number related information that is relevant to the next generation network;
converting the subset of legacy telephone number related information to next generation telephone number related information that is utilized in the next generation network; and sending the next generation telephone number related information to the next generation network;
wherein a processor with transformation code reads data related to the class 3, 4 or 5 telephony switches and selects only predetermined portions of information as usable data, wherein the selected information is stored in a common database to allow for further data manipulation, wherein the information converter runs transformations on the selected data and outputs text files and executable files, the text files containing the useable data and the executable files perform the movement of the useable data into a VoIP system in order to transfer customers and system configuration information from legacy systems to state of the art VoIP systems;
wherein the information converter has a master file with data fields and specifications for the data fields, and having process specifications for how to handle the data fields, wherein the master file is operatively coupled to a database build component that forms the information that is stored in a database, and wherein the information converter has a network element build component, wherein the network element build component has a network element load generation code that is an upload and download interface, wherein the network element load generation code is operatively coupled to a network element script generator, which is operatively coupled to the database, and wherein the network element script generator is operatively coupled to a network element package generator.

17. The method according to claim 16, wherein the method further comprises storing the converted subset of legacy telephone number related information in a common database.

18. The method according to claim 17, wherein the method further comprises transforming the stored subset of legacy telephone number related information into text files and executable files that are sent to the next generation network.

19. The method according to claim 18, wherein the text files contain usable data, and wherein the executable files perform a movement of the usable data into the next generation network.

20. The method according to claim 16, wherein the legacy telephone number related information has at least specific personal information, interconnect backbone information, telephone trunk and routing assignments, and parameters and configuration values for call processing features and services, and wherein the next generation telephone number related information has at least specific personal information, interconnect backbone information, telephone trunk and routing assignments, and parameters and configuration values for call processing features and services.

21. The method according to claim 20, wherein the interconnect backbone information, of each of the legacy telephone number related information and the next generation telephone number related information, has major information and minor information, wherein the major information has at least trunk assignments and cress switch transport linkage, and wherein the minor information has at least assignments and terminations for individual subscribers and/or data lines.

* * * * *